United States Patent
Zhang et al.

(10) Patent No.: US 11,668,637 B2
(45) Date of Patent: Jun. 6, 2023

(54) JOINT CHARACTERIZATION METHOD OF PORE STRUCTURES BASED ON LEAST SQUARE METHOD AND DATA PROCESSING METHOD

(71) Applicants: Southwest Petroleum University, Chengdu (CN); China University of Geosciences, Wuhan, Wuhan (CN)

(72) Inventors: Kun Zhang, Chengdu (CN); Shu Jiang, Wuhan (CN); Jun Peng, Chengdu (CN); Xiaoming Zhao, Chengdu (CN); Bin Li, Chengdu (CN); Lei Chen, Chengdu (CN); Pei Liu, Chengdu (CN); Xuejiao Yuan, Chengdu (CN); Fengli Han, Chengdu (CN); Xueying Wang, Chengdu (CN)

(73) Assignees: SOUTHWEST PETROLEUM UNIVERSITY, Chengdu (CN); CHINA UNIVERSITY OF GEOSCIENCES, WUHAN, Wuhan (CN)

( * ) Notice: Subject to any disclaimer, the term of this patent is extended or adjusted under 35 U.S.C. 154(b) by 0 days.

(21) Appl. No.: 17/950,244

(22) Filed: Sep. 22, 2022

(65) Prior Publication Data

US 2023/0096906 A1 Mar. 30, 2023

(30) Foreign Application Priority Data

Sep. 24, 2021 (CN) .......................... 202111120613.5

(51) Int. Cl.
*G01N 15/08* (2006.01)
*G01N 33/24* (2006.01)
*E21B 49/00* (2006.01)

(52) U.S. Cl.
CPC ....... *G01N 15/0806* (2013.01); *E21B 49/005* (2013.01); *E21B 2200/20* (2020.05); *E21B 2200/22* (2020.05); *G01N 2015/0866* (2013.01)

(58) Field of Classification Search
CPC .... G01N 15/00; G01N 15/08; G01N 15/0806; G01N 33/00; G01N 33/24;
(Continued)

(56) References Cited

U.S. PATENT DOCUMENTS 10,816,452 B2* 10/2020 Wang ................... G01N 15/088

FOREIGN PATENT DOCUMENTS

| CN | 105974092 A | * | 9/2016 | ............. G01N 33/24 |
| CN | 111189758 A | * | 5/2020 | ............. G01N 15/08 |
| CN | 114577677 A | * | 6/2022 | ............. G01N 13/04 |

OTHER PUBLICATIONS

CNIPA, Notification of a First Office Action for CN202111120613.5, dated May 18, 2022.
(Continued)

*Primary Examiner* — Nguyen Q. Ha
(74) *Attorney, Agent, or Firm* — Zhigang Ma

(57) ABSTRACT

A data processing method includes: collecting test data of a target rock sample in different gas adsorption experiments; the test data including pore sizes and pore volumes corresponding to the pore sizes and including at least two selected from the group consisting of the test data with pore sizes less than 3 nm in $CO_2$ adsorption experiment, the test data with pore sizes in 1.5 nm to 250 nm in $N_2$ adsorption experiment and the test data with pore sizes in 10 nm to 1000 μm in high-pressure mercury adsorption experiment; and fitting the test data in overlapping ranges of the pore sizes using a least square method, and obtaining target pore volumes corresponding to the pore sizes respectively. The accuracy of
(Continued)

joint characterization of shale pore structures can be improved by using mathematical methods to process the data in overlapping ranges of pore sizes among different characterization methods.

5 Claims, 4 Drawing Sheets

(58) Field of Classification Search
CPC .......... G01N 2015/0866; E21B 49/005; E21B 2200/20; E21B 2200/22
See application file for complete search history.

(56) References Cited

OTHER PUBLICATIONS

Southwest Petroleum University (Applicant), Reply to Notification of a First Office Action for CN202111120613.5, w/ (allowed)replacement claims, dated May 18, 2022.
CNIPA, Notification to grant patent right for invention in CN202111120613.5, dated Jun. 1, 2022.

* cited by examiner

US 11,668,637 B2

JOINT CHARACTERIZATION METHOD OF PORE STRUCTURES BASED ON LEAST SQUARE METHOD AND DATA PROCESSING METHOD

TECHNICAL FIELD

The invention relates to the field of oil and gas reservoir exploitation technologies, in particular to a joint characterization method of pore structures based on a least squares method and a data processing method.

BACKGROUND

Shale gas is a popular unconventional oil and gas resource today. Before developing shales, in order to properly evaluate shale reservoirs, quantitative analysis is needed to characterize pore volumes of different pore sizes developed in the shale reservoirs, thus providing key parameters for reservoir states and flow studies of the shale gas to avoid economic loss of exploration and development or loss of recoverable resources.

Among gas adsorption experiments, a carbon dioxide ($CO_2$) adsorption experiment can characterize pores with pore sizes less than 3 nanometers (nm), a nitrogen ($N_2$) adsorption experiment can characterize pores with pore sizes in a range from 1.5 nm to 250 nm, and a high-pressure mercury intrusion experiment can characterize pores with pore sizes in a range from 10 nm to 1000 micrometers (μm). However, the prior art only takes data with the pore sizes less than 2 nm for the $CO_2$ adsorption experiment to characterize micropores (their pore sizes are less than 2 nm), the prior art only takes data with the pore sizes in the range from 2 nm to 50 nm for the $N_2$ adsorption experiment to characterize mesopores (their pore sizes are in the range from 2 nm to 50 nm), and the prior art only takes data with the pore sizes greater than 50 nm for the high-pressure mercury intrusion experiment to characterize macropores (their pore sizes are greater than 50 nm). Overlapping parts of three characterized pore size ranges are not processed, but the overlapping parts are simply deleted, which affects the accuracy of joint characterization results.

SUMMARY

In view of the above problems, the invention aims to provide a joint characterization method of pore structures based on a least squares method and a data processing method, which improves the accuracy of joint characterization of pore structures by processing data in the overlapping parts of the pore size ranges with mathematical methods.

The technical solutions of the invention are as follows.

In an aspect, a data processing method for joint characterization of pore structures based on a least square method is provided and includes the following steps:

collecting test data of a target rock sample in different gas adsorption experiments; the test data including pore sizes and pore volumes corresponding to the pore sizes respectively; and fitting the test data in overlapping ranges of the pore sizes using the least square method, and obtaining final pore volumes (also referred to as target pore volumes) corresponding to the pore sizes respectively.

The final pore volumes corresponding to the pore sizes may be taken as parameters to evaluate shale reservoirs.

In an embodiment, the test data include:

the test data with the pore sizes less than 3 nm in the $CO_2$ adsorption experiment and the test data with the pore sizes in a range from 1.5 nm to 250 nm in the $N_2$ adsorption experiment; or the test data with the pore sizes in a range from 1.5 nm to 250 nm in the $N_2$ adsorption experiment and the test data with the pore sizes in a range from 10 nm to 1000 μm in a high-pressure mercury adsorption experiment (also referred to as the high-pressure mercury intrusion experiment); or the test data with the pore sizes less than 3 nm in the $CO_2$ adsorption experiment, the test data with the pore sizes in a range from 1.5 nm to 250 nm in the $N_2$ adsorption experiment and the test data with the pore sizes in a range from 10 nm to 1000 μm in the high-pressure mercury adsorption experiment.

In an embodiment, the fitting the test data in overlapping ranges of the pore sizes using the least square method, specifically includes the following sub-steps:

first, calculating an average value of the two pore volumes corresponding to each of the pore sizes in the overlapping ranges to obtain discrete data sets ($x_i$, $y_i$); the $x_i$, representing the pore size, the $y_i$ representing a calculated pore volume (i.e., the average value of the two pore volumes);

second, drawing a curve according to the discrete data sets ($x_i$, $y_i$), and setting the curve as a fitting curve of a basic elementary function;

third, solving the basic elementary function by linear fitting to obtain solution results, and substituting the solution results into the basic elementary function to obtain a finial basic elementary function (also referred to as target basic elementary function);

final, substituting each the $x_i$ of the discrete data sets into the target basic elementary function to obtain the final pore volume corresponding to each the $x_i$.

In an embodiment, the basic elementary function includes an exponential function.

In an embodiment, the exponential function is set as $y=ae^{bx}$, the solving the basic elementary function by linear fitting, specifically includes the following sub-steps:

first, taking natural logarithm on both sides of the exponential function to obtain a formula (1):

$$ln(y)=ln(a)+bx \quad (1);$$

second, converting the formula (1) to a formula (2) by setting $u=ln(y)$ and $c=ln(a)$:

$$u=c+bx \quad (2);$$

third, setting a formula (3):

$$u=a_0+a_1 x \quad (3);$$

and then performing the linear fitting on the discrete data sets to obtain a formula (4):

$$\begin{cases} u_1 = m_1 a_0 + n_1 a_1 x \\ u_2 = m_2 a_0 + n_2 a_1 x \end{cases} \quad (4)$$

final, solving the formula (4) to obtain values of the $a_0$, and the $a_1$, and solving a value of the a according to $a_0=c=ln(a)$; obtaining a value of the b according to $a_1=b$, and substituting the values of the a and the b into the exponential function to obtain the target basic elementary function.

In another aspect, a joint characterization method of pore structures based on a least square method is provided and includes: using the above data processing method to process the test data in the overlapping ranges of the pore sizes of the target rock sample in the different gas adsorption experiments, and thereby obtaining joint characterization of the pore structures.

The joint characterization of the pore structures may be used to evaluate shale reservoirs.

The beneficial effects of the invention are as follows:

the invention uses the mathematical methods to process the data in the overlapping range between the $CO_2$ adsorption experiment and the $N_2$ adsorption experiment, as well as the data in the overlapping range between the $N_2$ adsorption experiment and the high-pressure mercury intrusion experiment, and makes full use of the experimental data to make the characterization method more accurate.

BRIEF DESCRIPTION OF THE DRAWINGS

In order to more clearly explain the embodiments of the invention or the technical solutions in the prior art, the following will briefly introduce the drawings needed to be used in the embodiments or the description of the prior art. Apparently, the drawings in the following description are only some of the embodiments of the invention. For those skilled in the art, they can also obtain other drawings based on these drawings without paying creative labor.

DETAILED DESCRIPTION OF THE EMBODIMENTS

Figure 1:
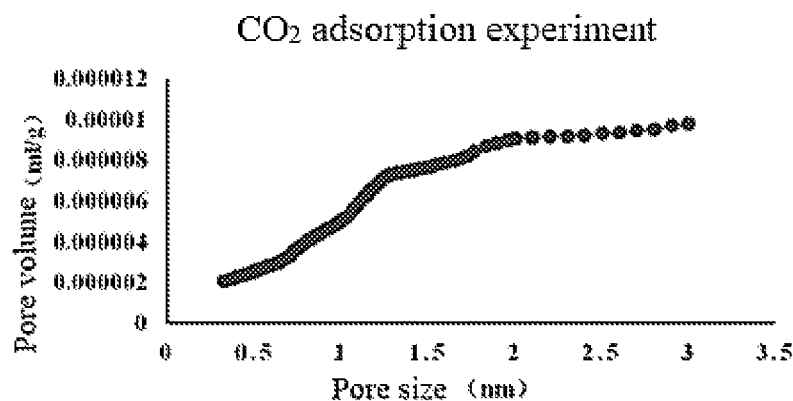
FIG. 1 illustrates a schematic diagram of results of a $CO_2$ adsorption experiment according to an embodiment of the disclosure.

The invention is further described below in combination with the drawings and embodiments. It should be noted that the embodiments and the technical features in the embodiments of the invention can be combined with each other without conflict. It should be noted that, unless otherwise specified, all technologies and scientific terms used in the invention have the same meanings as those commonly understood by those skilled in the art. The words "include" or "contain" and the like used in the embodiments of the invention mean that elements or objects appearing before the word cover elements or objects appearing after the word and their equivalents, without excluding other elements or objects.

In an aspect, the invention provides a data processing method for joint characterization of pore structures based on a least square method, including the following steps.

S1, collecting test data of a target rock sample in different gas adsorption experiments. The test data include pore sizes and pore volumes corresponding to the pore sizes respectively.

In an illustrated embodiment, the test data include: the test data with the pore sizes less than 3 nm in a $CO_2$ adsorption experiment and the test data with the pore sizes in a range from 1.5 nm to 250 nm in a nitrogen ($N_2$) adsorption experiment; or the test data with the pore sizes in a range from 1.5 nm to 250 nm in the $N_2$ adsorption experiment and the test data with the pore sizes in a range from 10 nm to 1000 μm in a high-pressure mercury adsorption experiment; or the test data with the pore sizes less than 3 nm in the $CO_2$ adsorption experiment, the test data with the pore sizes in a range from 1.5 nm to 250 nm in the $N_2$ adsorption experiment and the test data with the pore sizes in the range from 10 nm to 1000 μm in the high-pressure mercury adsorption experiment.

S2, the test data in overlapping ranges of the pore sizes are fitted using the least squares method to obtain final pore volumes corresponding to the pore sizes respectively, which specifically includes the following sub-steps.

S21, calculating an average value of the two pore volumes corresponding to each of the pore sizes in the overlapping ranges to obtain discrete data sets $(x_i, y_i)$. The $x_i$ represents the pore size, and the $y_i$ represents a calculated pore volume (i.e., the average value).

S22, drawing a curve according to the discrete data sets $(x_i, y_i)$, and setting the curve as a fitting curve of a basic elementary function.

In an illustrated embodiment, the basic elementary function is an exponential function. It should be noted that the basic elementary function of this embodiment is the basic elementary function preferred by the inventor for the comprehensive calculation accuracy and calculation time. In addition to the basic elementary function of this embodiment, the invention can also be calculated using a gas basic elementary function in the prior art.

S23, solving the basic elementary function by linear fitting to obtain solution results, and substituting the solution results into the basic elementary function to obtain a final basic elementary function.

In an illustrated embodiment, the exponential function is set as $y=ae^{bx}$, the solving the basic elementary function by linear fitting, specifically includes the following sub-steps:

first, taking natural logarithm on both sides of the exponential function to obtain a formula (1):

$$\ln(y)=\ln(a)+bx \quad (1);$$

second, setting $u=\ln(y)$ and $c=\ln(a)$, and converting the formula (1) to a formula (2):

$$u=c+bx \quad (2);$$

third, setting a formula (3):

$$u=a_0+a_1x \quad (3);$$

and then, performing the linear fitting on the discrete data sets to obtain a formula (4);

$$\begin{cases} u_1 = m_1 a_0 + n_1 a_1 x \\ u_2 = m_2 a_0 + n_2 a_1 x \end{cases} \quad (4)$$

finally, solving the formula (4) to obtain values of the $a_0$ and the $a_1$, and solving the value of a according to $a_0=c=\ln(a)$; obtaining the value of the b according to $a_1=b$, and substituting the values of the a and the b into the exponential function to obtain the final basic elementary function.

S24, the final pore volume corresponding to each the $x_i$ is obtained by substituting each the $x_i$ of the discrete data sets into the final basic elementary function.

In another aspect, the invention further provides a joint characterization method of pore structures based on a least square method, for the test data in overlapping ranges of the pore sizes of the target rock sample in the different gas adsorption experiments, any one of above described data processing methods is used to process the test data, and the joint characterization of the pore structures is obtained (i.e., performing joint characterization on the pore structures based on the final pore volumes).

In an illustrated embodiment, taking a target rock sample as an example, the data processing method for joint characterization of pore structures based on the least square method described in the invention is used to process to obtain joint characterization data of pore structures of the target rock sample. Specifically, the processing includes the following steps.

Figure 2:
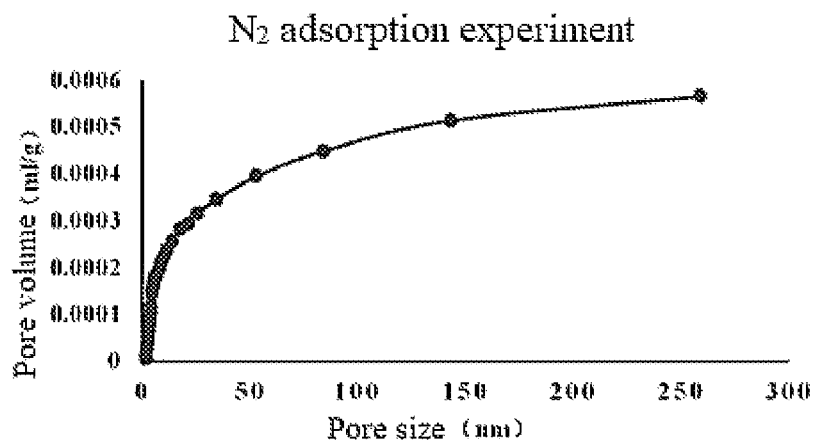
FIG. 2 illustrates a schematic diagram of results of a $N_2$ adsorption experiment according to an embodiment of the disclosure.
Figure 3:
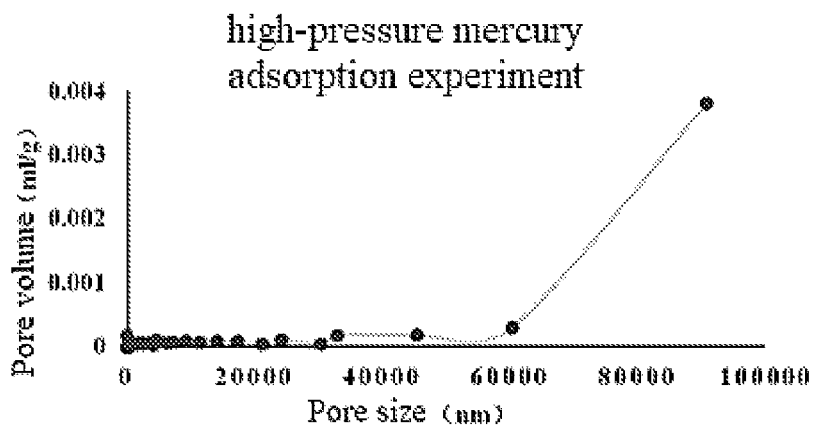
FIG. 3 illustrates a schematic diagram of results of a high-pressure mercury adsorption experiment according to an embodiment of the disclosure.

(1) Obtaining test data of the target rock sample, which include the test data with pore sizes less than 3 nm in the $CO_2$ adsorption experiment, the test data with pore sizes in a range from 1.5 nm to 250 nm in the $N_2$ adsorption experiment, and the test data with pore sizes in a range from 10 nm to 1000 μm in the high-pressure mercury adsorption experiment. The test data include pore sizes and pore volumes corresponding to the pore sizes respectively. The obtained results are shown in FIGS. 1 to 3 respectively.

(2) Obtaining the data in an overlapping range with a pore size range of 1.5 nm to 3 nm between the $CO_2$ adsorption experiment and the $N_2$ adsorption experiment, calculating average values for the obtained data, and obtaining discrete data sets ($x_i$, $y_i$). The calculated results are shown in Table 1 and FIG. 4.

TABLE 1

Average values of the data in the overlapping range between the $CO_2$ adsorption experiment and the $N_2$ adsorption experiment.

| Pore size $x_i$ (nm) | Pore volume $y_i$ (ml/g) | Pore size $x_i$ (nm) | Pore volume $y_i$ (ml/g) |
|---|---|---|---|
| 1.5 | 0.00000754 | 2.3 | 0.00002173 |
| 1.6 | 0.00000745 | 2.4 | 0.00002366 |
| 1.7 | 0.0000074 | 2.5 | 0.00002609 |
| 1.8 | 0.00000736 | 2.6 | 0.00002801 |
| 1.9 | 0.0000073 | 2.7 | 0.00002996 |
| 2 | 0.0000092 | 2.8 | 0.000032 |
| 2.1 | 0.00001766 | 2.9 | 0.000034845 |
| 2.2 | 0.0000201 | 3.0 | 0.000038225 |

Figure 4:
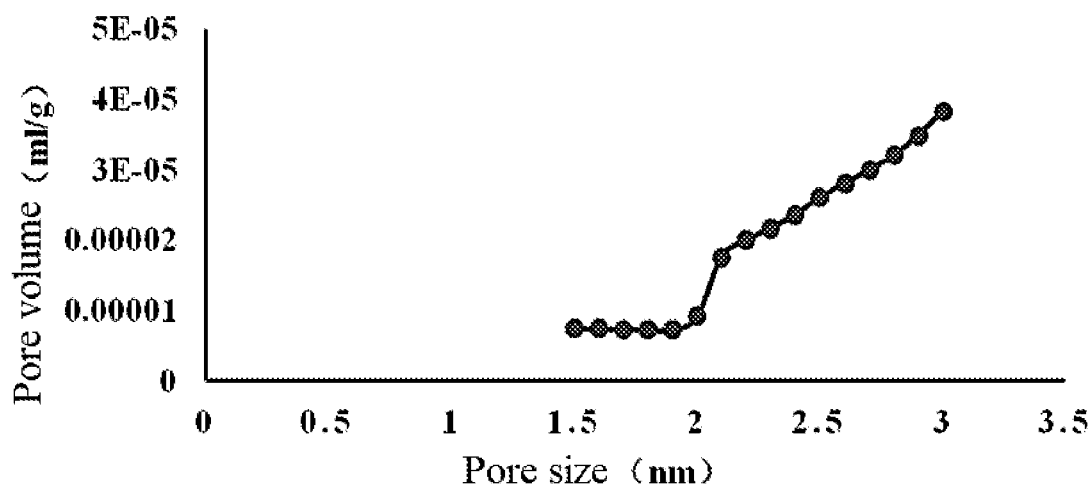
FIG. 4 illustrates a schematic diagram of average value results of an overlapping range between the $CO_2$ adsorption experiment and the $N_2$ adsorption experiment according to an embodiment of the disclosure.

(3) Setting a curve shown in FIG. 4 to be a fitted curve of an exponential function $y=ae^b$, and solving it by linear fitting, specifically, including the following steps:

first, taking the natural logarithm on both sides of the exponential function to obtain the formula shown in the formula (1); setting $u=\ln(y)$ and $c=\ln(a)$, converting the formula (1) to the formula (2), and setting u as the formula (3);

second, as shown in FIG. 4, the change trends of the discrete data sets are different in the pore size range with 1.5 nm to 2 nm and the pore size range with 2 nm to 3 nm, therefore the linear fittings are carried out for the two segments respectively. The fitting results of the pore size range with 1.5 nm to 2 nm and the pore size range with 2 nm to 3 nm are shown in the formula (5) and the formula (6) respectively:

$$\begin{cases} 37.05 = 5a_0 + 8.5a_1 x \\ 62.928 = 8.5a_0 + 14.55a_1 x \end{cases} \quad (5)$$

$$\begin{cases} 27.22 = 10a_0 + 25.5a_1 x \\ 71.211 = 25.5a_0 + 65.85a_1 x \end{cases} \quad (6)$$

Then, solving the formula (5) and formula (6) respectively, and obtaining $a_0=8.379$ and $a_1=-0.57$ in the pore size range with 1.5 nm to 2 nm, and $a_0=-2.84163636364$ and $a_1=2.181818182$ in the pore size range with 2 nm to 3 nm. The formula (3) is changed to be a formula (7).

$$\begin{cases} u = 8.379 - 0.57x \text{ (the pore size is in the range of 1.5 nm to 2 nm)} \\ u = -2.84163636364 + \\ \quad 2.181818182x \text{ (the pore size is in the range of 2 nm to 3 nm)} \end{cases} \quad (7)$$

Owning to $\ln(a)=a_0$ and $b=a_1$, the finial exponential function can be obtained as follows.

$$\begin{cases} y = ae^{bx} = e^{8.379}e^{-0.57x} \\ \text{(the pore size is in the range of 1.5 nm to 2 nm)} \\ y = ae^{bx} = e^{-2.84163636364}e^{2.181818182x} \\ \text{(the pore size is in the range of 2 nm to 3 nm)} \end{cases} \quad (8)$$

Figure 5:
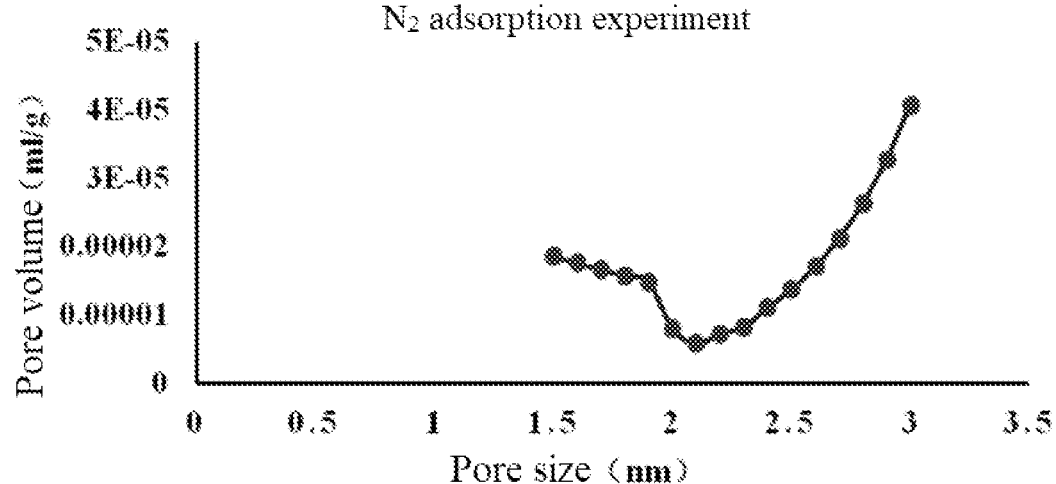
FIG. 5 illustrates a schematic diagram of joint characterization results of the overlapping range between the $CO_2$ adsorption experiment and the $N_2$ adsorption experiment according to an embodiment of the disclosure.

(4) Substituting the $x_i$ in the Table 1 into the formula (8) to obtain jointly characterized pore volumes in the overlapping range between the $CO_2$ adsorption experiment and the $N_2$ adsorption experiment, and the results are shown in FIG. 5.

(5) Obtaining data in an overlapping range with a pore size range of 10 nm to 250 nm between the $N_2$ adsorption experiment and the high-pressure mercury adsorption experiment, calculating average values for the obtained data, and obtaining discrete data sets ($x_i$, $y_i$). The calculated results are as shown in Table 2 and FIG. 6.

TABLE 2

Average value of the data in the overlapping range between the $N_2$ adsorption experiment and the high-pressure mercury adsorption experiment.

| Pore size $x_i$ (nm) | Pore volume $y_i$ (ml/g) | Pore size $x_i$ (nm) | Pore volume $y_i$ (ml/g) |
|---|---|---|---|
| 10 | 0.0002335 | 90 | 0.000449 |
| 20 | 0.000292 | 100 | 0.0004702 |
| 30 | 0.000337 | 140 | 0.0005281 |
| 40 | 0.000363 | 180 | 0.0005281 |
| 50 | 0.000391 | 220 | 0.0005629 |
| 60 | 0.000414 | 240 | 0.0005751 |
| 70 | 0.000426 | 250 | 0.0005892 |
| 80 | 0.000438 | — | — |

Figure 6:
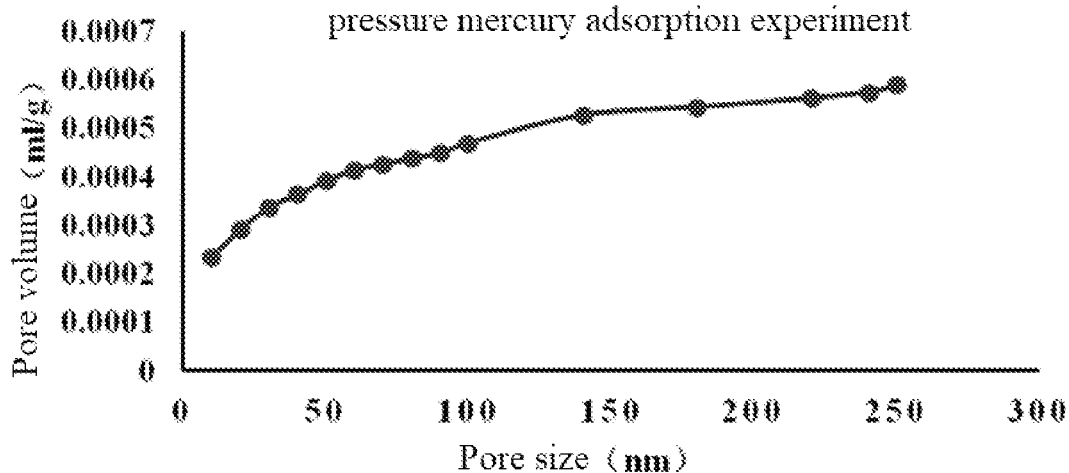
FIG. 6 illustrates a schematic diagram of average value results of an overlapping range between the $N_2$ adsorption experiment and the high-pressure mercury adsorption experiment according to an embodiment of the disclosure.

(6) Setting a curve shown in FIG. 6 to be a fitted curve of an exponential function $y=ae^{bx}$, and solving it by linear fitting, specifically, including the following steps:

first, taking the natural logarithm on both sides of the exponential function to obtain the formula shown in the formula (1); setting u=In(y) and c=In(a), and converting the formula (1) to the formula (2), and setting u as the formula (3);

second, the linear fitting is performed on the curve shown in FIG. 6. The results are as follows.

$$\begin{cases} 33.929 = 15a_0 + 15808a_1x \\ 4061.4 = 1580a_0 + 258910a_1x \end{cases} \quad (9)$$

Then, solving the formula (9) and obtaining $a_0$=1.707 and $a_1$=0.0000527 in the pore size range with 10 nm to 250 nm. The formula (3) is changed to be formula (10): u=1.707+0.0000527x (the pore size is in the range of 10 nm to 250 nm) (10).

Owning to In(a)=$a_0$ and b=$a_1$, the finial exponential function can be obtained as follows:

$$y=ae^{bx}=e^{1.707}e^{0.0000527x} \text{ (the pore size is in the range of 10 nm to 250 nm)} \quad (11).$$

Figure 7:
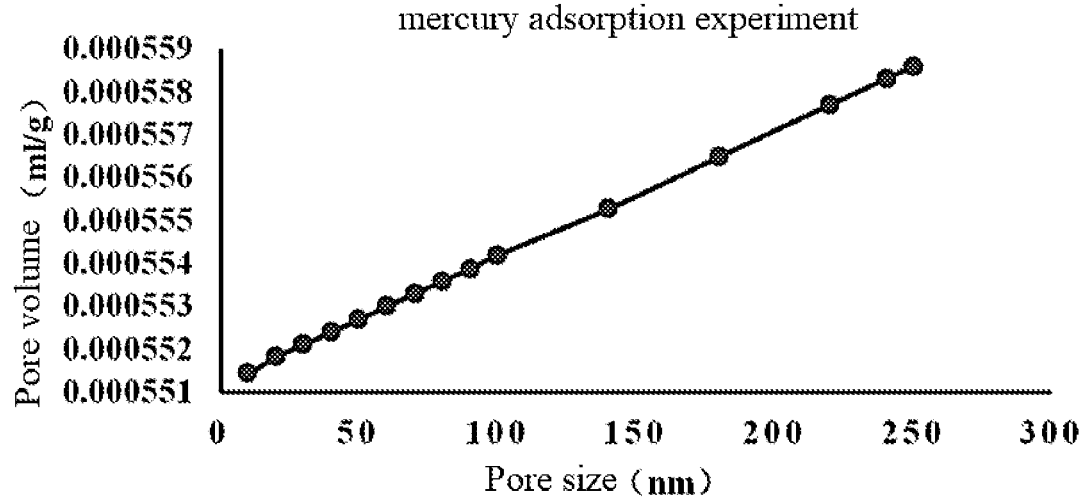
FIG. 7 illustrates a schematic diagram of joint characterization results of the overlapping range between the $N_2$ adsorption experiment and the high-pressure mercury adsorption experiment according to an embodiment of the disclosure.

(7) Substituting the $x_i$ in the Table 2 into the formula (11) to obtain the jointly characterized pore volumes in the overlapping range between the $N_2$ adsorption experiment and the high-pressure mercury adsorption experiment, and the results are shown in FIG. 7.

Figure 8:
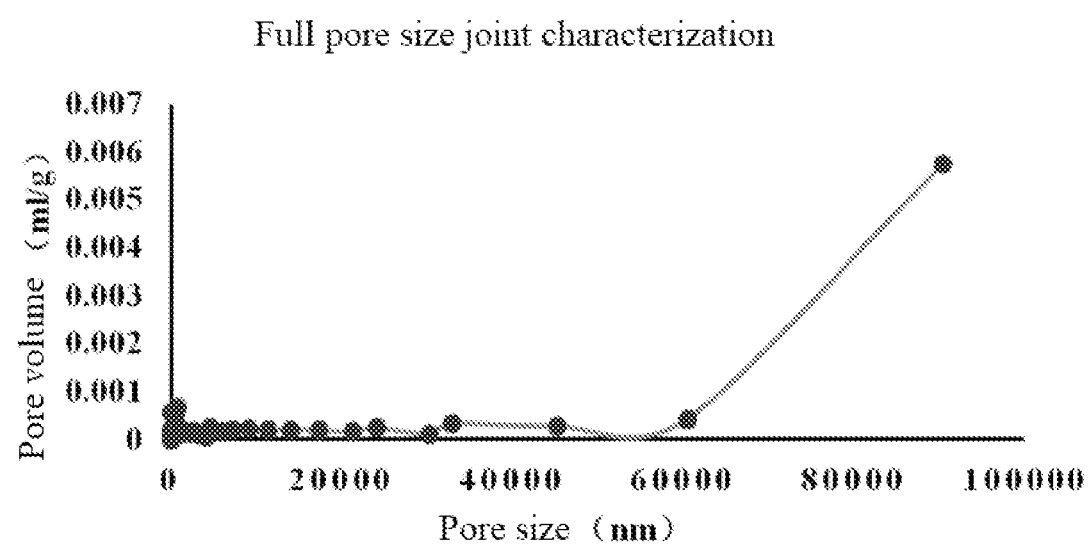
FIG. 8 illustrates a schematic diagram of joint characterization results of full pore sizes according to an embodiment of disclosure.

(8) Combining the joint characterization results (i.e., jointly characterized pore volumes) of the step (4) and the step (7) with the data of other non-overlapping ranges to finally obtain the joint characterization results of the full pore size range shown in FIG. 8.

The above description is only an illustrated embodiment of the invention, and does not limit the invention in any form. Although the invention has been disclosed in an illustrated embodiment, it is not used to limit the invention. Those skilled in the art, without departing from the scope of the technical scheme of the invention, can make some changes or modify the above disclosed technical contents to equivalent embodiments, however, any simple modification, equivalent change and modification to the above embodiments according to the technical essence of the invention without departing from the content of the technical solution of the invention are still within the scope of the technical solution of the invention.

What is claimed is:

1. A data processing method for joint characterization of pore structures based on a least square method, comprising:
    collecting test data of a target rock sample in different gas adsorption experiments; wherein the test data comprise pore sizes and pore volumes corresponding to the pore sizes respectively; and
    fitting the test data in overlapping ranges of the pore sizes using the least square method, and obtaining target pore volumes corresponding to the pore sizes respectively;
    wherein the fitting the test data in overlapping ranges of the pore sizes using the least square method, comprises:
        calculating an average value of two the pore volumes corresponding to each of the pore sizes in the overlapping ranges, and obtaining discrete data sets ($x_i$, $y_i$); wherein the $x_i$ represents the pore size, and the $y_i$ represents the average value;
        generating a curve according to the discrete data sets ($x_i$, $y_i$), and setting the curve as a fitting curve of a basic elementary function;
        solving the basic elementary function by linear fitting to obtain solution results, and substituting the solution results into the basic elementary function to obtain a target basic elementary function; and
        substituting the $x_i$ of the discrete data sets into the target basic elementary function to obtain the target pore volume corresponding to each the $x_i$.

2. The data processing method according to claim 1, wherein the test data comprise:
    the test data with the pore sizes less than 3 nanometers (nm) in a carbon dioxide adsorption experiment and the test data with the pore sizes in a range from 1.5 nm to 250 nm in a nitrogen adsorption experiment; or
    the test data with the pore sizes in a range from 1.5 nm to 250 nm in a nitrogen adsorption experiment and the test data with the pore sizes in a range from 10 nm to 1000 micrometers (μm) in a high-pressure mercury adsorption experiment; or
    the test data with the pore sizes less than 3 nm in a carbon dioxide adsorption experiment, the test data with the pore sizes in a range from 1.5 nm to 250 nm in a nitrogen adsorption experiment and the test data with the pore sizes in a range from 10 nm to 1000 μm in a high-pressure mercury adsorption experiment.

3. The data processing method according to claim 1, wherein the basic elementary function comprises an exponential function.

4. The data processing method according to claim 3, wherein the exponential function is set as $y=ae^{bx}$ and the solving the basic elementary function by linear fitting, comprises:
    taking natural logarithm on both sides of the exponential function to obtain a formula (1):

$$In(y)=In(a)+bx \quad (1);$$

converting the formula (1) to a formula (2) by setting u=In(y) and c=In(a):

$$u=c+bx \quad (2);$$

setting a formula (3):

$$u=a_0+a_1x \quad (3)$$

and performing the linear fitting on the discrete data sets to obtain a formula (4):

$$\begin{cases} u_1 = m_1a_0 + n_1a_1x \\ u_2 = m_2a_0 + n_2a_1x \end{cases} \quad (4)$$

solving the formula (4) to obtain values of the $a_0$ and the $a_1$, and solving a value of the a according to $a_0$=c=In(a); obtaining a value of the b according to $a_1$=b, and substituting the values of the a and the b into the exponential function to obtain the target basic elementary function.

5. A joint characterization method of pore structures based on a least square method, comprising:
    using the data processing method according to claim 1 to process the test data in the overlapping ranges of the pore sizes of the target rock sample in the different gas adsorption experiments, and thereby obtaining joint characterization of the pore structures.

* * * * *